United States Patent [19]
Georgiou et al.

[11] Patent Number: 5,189,314
[45] Date of Patent: Feb. 23, 1993

[54] VARIABLE CHIP-CLOCKING MECHANISM

[75] Inventors: Christos J. Georgiou, White Plains; Thor A. Larsen, Hopewell Junction; Eugen Schenfeld, Mount Kisco, all of N.Y.

[73] Assignee: International Business Machines Corporation, Armonk, N.Y.

[21] Appl. No.: 754,795

[22] Filed: Sep. 4, 1991

[51] Int. Cl.$^5$ ............................................. H03K 3/72
[52] U.S. Cl. .................................. 307/271; 307/231; 307/310; 377/49
[58] Field of Search .................. 307/271, 231, 310; 377/49

[56] References Cited

U.S. PATENT DOCUMENTS

| | | | |
|---|---|---|---|
| 4,489,279 | 12/1984 | Kuroki | 307/271 |
| 4,670,837 | 6/1987 | Sheets | 307/271 |
| 5,008,771 | 4/1991 | Palara | 307/310 |
| 5,073,838 | 12/1991 | Ames | 307/310 |

Primary Examiner—William L. Sikes
Assistant Examiner—Scott A. Ouellette
Attorney, Agent, or Firm—Ronald L. Drumheller

[57] ABSTRACT

The performance of some chips (e.g., VLSI processors) may be increased by running the internal circuits at higher clock rates, but use of a higher clock rate is limited by the heat-dissipation ability of the chip's package. Apparatus and a method is described for estimating the total heat accumulated for dissipation at any given time. For the periods that the chip is idle, the clock rate is decreased to reduce heat generation. The heat saved while the chip is idling is available for use later to increase the clock rate above normal, provided that the total heat generated does not exceed the heat-dissipation capacity of the package.

7 Claims, 2 Drawing Sheets

VARIABLE CHIP-CLOCKING MECHANISM

BACKGROUND OF THE INVENTION

1. Field of the Invention

This invention relates to semiconductor chip speed performance and more specifically to the limitation on chip speed performance which occurs as a consequence of a limited heat removal ability. More particularly, this invention relates to the maximum clocking rates which are imposed on chips fabricated in some of the popular technologies as a direct consequence of limitations in the rate at which heat can be removed from a chip.

2. Description of the Prior Art

The performance of some chips (especially VLSI chips) is bounded by the heat removal ability of their packages. Heat generation and removal is a problem accounting for the maximum clock rates specified for some VLSI chips. It is desirable to make these chips run faster, while staying within the heat removal limits of conventional packages.

One solution currently being pursued in the art is to cool the chip package using an external cooling device. Such a scheme has been used by Everex Systems, Inc. for the Intel 80486 microprocessor CPU chip that, although specified to run at a maximum of 25 MHz clock speed, achieves a clock rate of 50 MHz. The Everex scheme employs a product known as Icecap produced by Velox Computer Technology Inc., that cools the CPU chip to 0°. This is described by Michael Fitzgerald in "Everex set to show 50-MHz PC" in Computerworld, Vol. XXIV, No. 41, at page 4 (Oct. 8, 1990).

In U.S. Pat. No. 4,670,837, a microprocessor controls the clock frequency based on the present rate of required microprocessor activity. However, the speed performance of the microprocessor is not improved. Variation of the clock frequency is used to save power (i.e., battery life), not to improve chip speed performance.

In "Intel to Introduce 20-MHz Chip Set", InfoWorld, Vol. 12, Issue 42, page 5 (Oct. 15, 1990), Nico Krohn described a new chip set intended for the laptop computer market in which power management features are built into the microprocessor. In order to conserve battery life, every piece of logic can be powered down. Again, the focus is on battery life and there is no apparent speed performance gain as a consequence of any of the powering down.

Intel Corp. has also published that it intends to introduce a dual-clock microprocessor (See Jim Nash, "Dual-clock 486SX: Bonanza for Intel?", Computerworld, page 89 (Aug. 5, 1991). It appears that there will be a static allocation of the two clock frequences to the tasks inside the chip. Functions such as direct memory access will run at the lower clock frequency while massive computations will run at the higher clock frequency. While the apparent focus here is on heat dissipation, the clocking rate of each circuit does not vary over time, so the maximum clocking rate for each circuit is still determined by the maximum heat dissipation rate from that circuit.

SUMMARY OF THE INVENTION

It is an object of this invention to improve the speed performance of a chip by varying the clocking rate of circuits in the chip.

Another object is to use a clocking rate for a chip which is higher than the maximum clocking rate specified for the chip.

It is a further object to estimate heat buildup in a chip and to create and utilize heat dissipation savings through variation of the clocking rate in order to improve chip speed performance.

VLSI chips generate heat that is proportional to clock rates in most synchronously operated circuits based on most technologies (CMOS, NMOS, etc.). In accordance with this invention, heat production is controlled in accordance with needs through changes in clock rate (i.e., by slowing down the clock rate when a circuit is idling), in order to make it possible to speed up the clock rate when performing either special critical work or useful work in general, such that the total heat balance is kept (i.e., generating no more heat than can be dissipated without excessive heat buildup).

The clock rate is changed according to the particular activity that a circuit performs at any given time. When a circuit is switched to a lower clock rate, there is a heat generation savings. Given a certain heat dissipation capacity (based on the characteristics of the chip and package), it is possible to switch the clock to a higher rate, if enough heat savings have been accumulated. While operating at this higher clock rate, the accumulated heat savings is decreased to account for the extra heat generated.

The performance of the chip is improved by changing the clock to a higher rate than normally allowed. Heat production is avoided whenever possible not for the sake of conserving battery life, but for getting a higher speed performance, when the circuit is doing a job where speed performance is important. Circuits are not shut down (i.e., operating in "stand-by mode"), but rather their clocking rate is slowed, maintaining them still fully operational. Previously accumulated heat savings are then used to achieve higher performance for critical functions or when useful work is being done in general. Circuit activity is detected based on the circuit status (i.e., busy or idle, waiting or running, etc.). A circuit (or chip) is either accumulating heat savings or using them (or neither, depending upon implementation) based upon the clock speed, which in turn depends upon detected circuit status. The objective is to run the circuit faster when heat has been saved (because of other system delays, not those that are decided upon in advance). This dynamic scheme is much more flexible and general than any of the prior art schemes.

BRIEF DESCRIPTION OF THE DRAWINGS

FIG. 3 is a table relating the binary states of lines in FIG. 2.

DESCRIPTION OF THE PREFERRED EMBODIMENT

Figure 1:
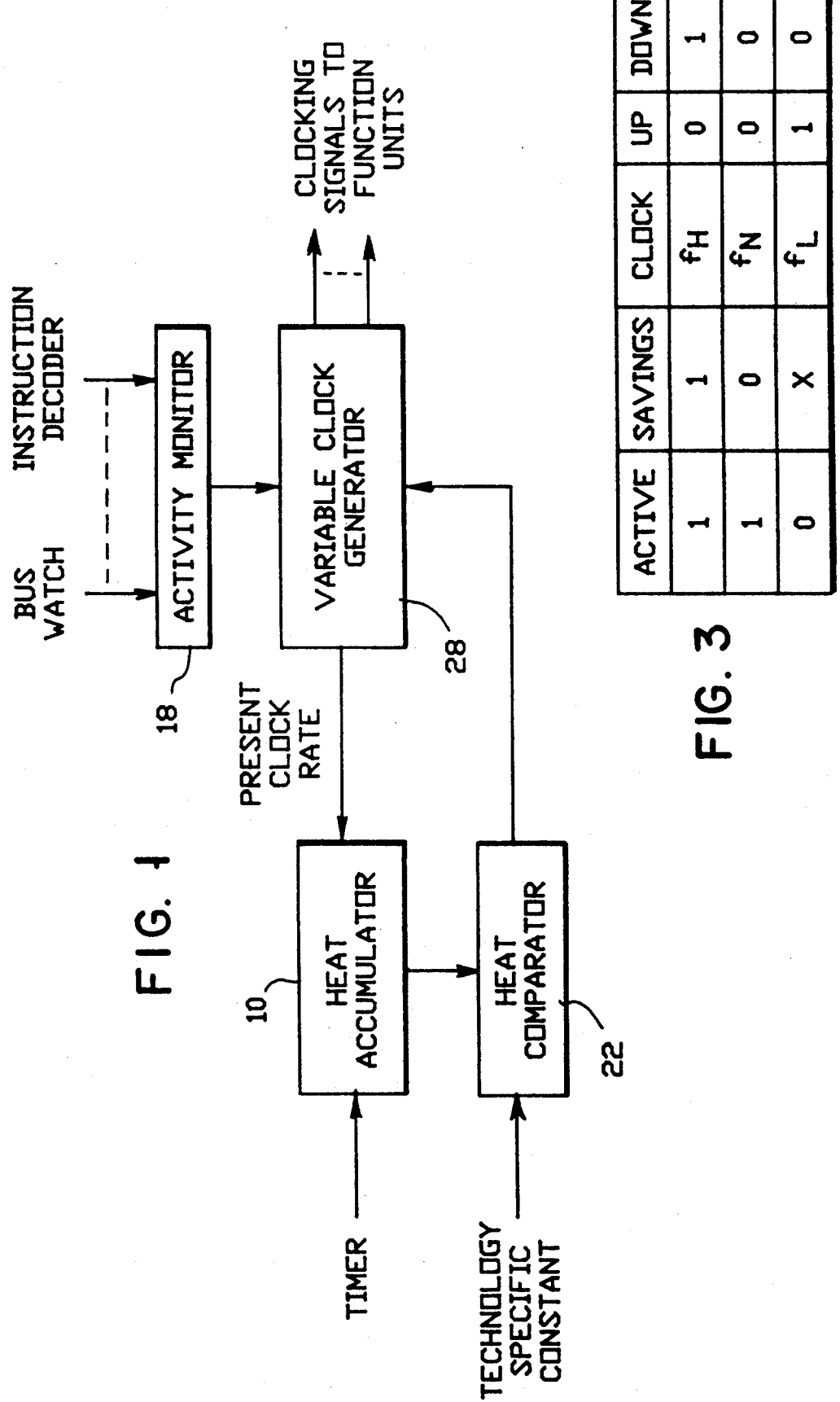
FIG. 1 is a block diagram of a variable clock mechanism for a chip in accordance with this invention.
Figure 2:
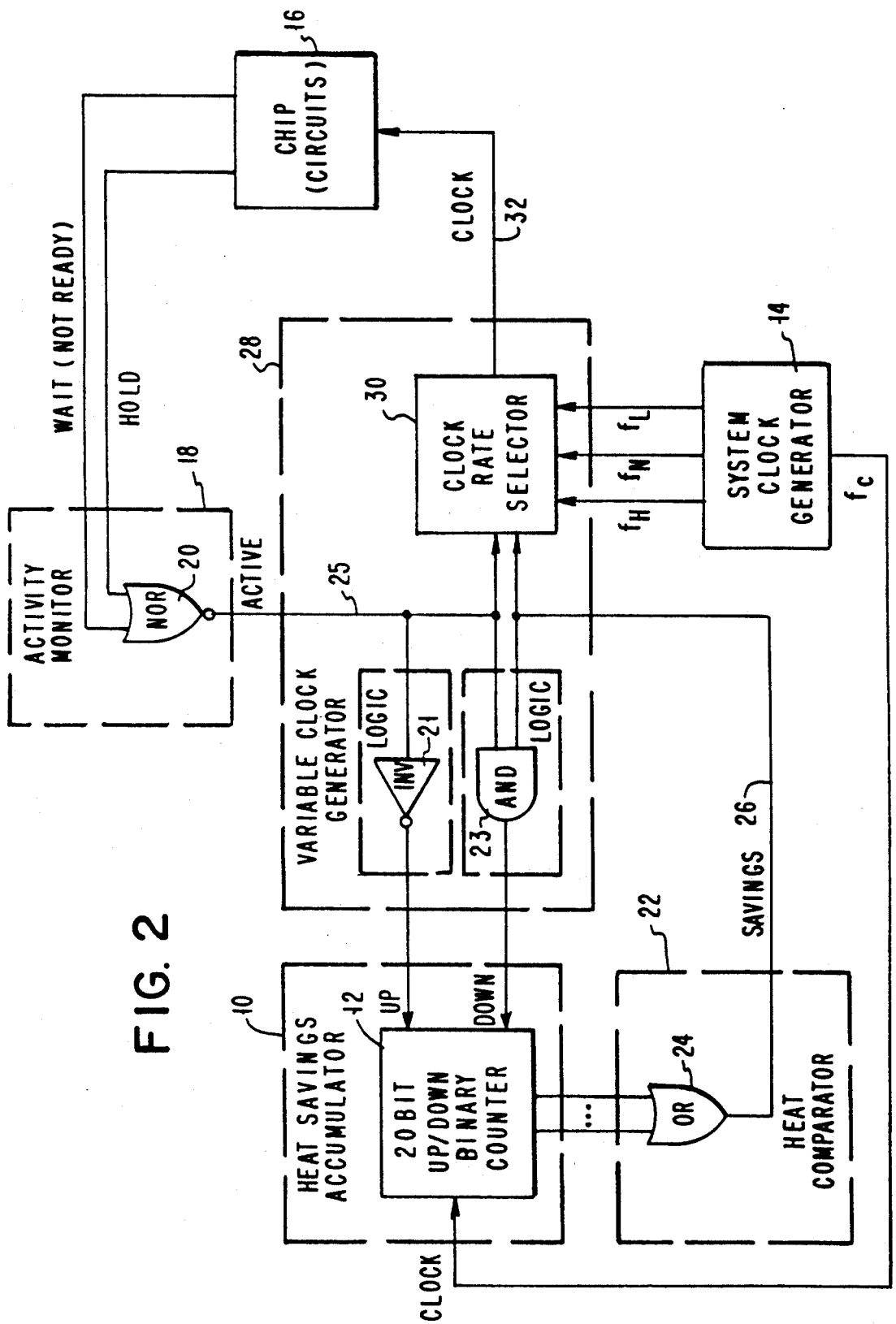
FIG. 2 illustrates in detail a circuit implementation of this invention for use with a CPU chip.

Referring now to FIGS. 1 and 2, a heat savings accumulator 10, which may be implemented simply as an up-down counter circuit 12, accumulates the gain and loss in terms of heat production units, while operating at a certain clock rate. The clock for the heat savings accumulator may be provided by an independent timer or more preferably from the same system clock generator 14 that provides the clocking frequencies for the chip 16 being controlled by the variable clocking mechanism. An upper bound is imposed on the maximum heat savings which may be accumulated (i.e., even if the circuit were idle for one hour it does not mean it can be operated at twice the normal clock rate for the next hour), based on the given thermal characteristics of the particular chip package.

Activity monitor 18 detects when each circuit (or the whole chip) can be operated at a lower clock rate (e.g., when it is idling or waiting for external events to occur). The activity monitor may monitor the chip as a whole or may sense the activity of the various units in the chip and change their corresponding clock speed individually. The illustrated embodiment does the former. The particular activity that is monitored, depends on the circuit design. For a CPU (i.e., central processing unit) chip, this monitored activity can be the specific instructions executed at any given time. An instruction decoder can be used to detect instructions that take a long time to complete by an external unit (e.g., a floating point numerical coprocessor), during which the main CPU chip is idle waiting for the instruction to be finished by the external unit. For the time these instructions are being executed by an external unit, the main CPU chip can be switched to a minimal clock rate and the heat savings accumulated without negative impact on performance. Another type of activity monitoring might be to observe bus activity. The activity monitor might simply detect the idle periods on a bus (i.e., a DMA transfer, forcing the CPU into a "hold" state; or a "not ready" signal).

When it becomes beneficial to operate the chip at a higher clock rate (e.g., useful work is being done) and there are enough "heat savings in the bank" (i.e., the value of the up-down heat counter is high enough), a synchronous shift to a higher clock rate can take place in order to improve speed performance.

In FIG. 2 the illustrated chip is a CPU (microprocessor) VLSI chip. The variable chip-clocking mechanism for this chip is implemented as follows:

Activity monitor 18 is simply a logical "NOR" gate 20 having as inputs the "wait" and "hold" lines of the CPU microprocessor bus. If either one of these lines is active, it means the CPU is not doing any work (and should operate at a lower clock rate to save heat generation). Otherwise, the CPU is active and a high clock rate is used, if there are accumulated heat savings. If there are no accumulated heat savings (or when the accumulated heat savings have been used up), a normal clock rate is used for the CPU when it is active.

Heat savings accumulator 10 keeps track of heat savings and is implemented with a 20-bit up/down binary counter 12. The size of the counter means that it is possible to accumulate up to about one million ($2^{20}$) "saved clock cycles." The counter counts up or down according to the logic states shown in the right two columns of the table in FIG. 3, which in turn is determined by the two left-side input columns. This relationship is implemented by an Inverter gate 21 and an "AND" gate 23. The counter does not overflow (meaning that it does not wrap-around to zero) or underflow (meaning that it does not go from 0 to 1 million). As shown in the table, counter 12 counts down when the clock rate is high and counts up when the clock rate is low. It should be apparent that with suitable logic modifications the sense (i.e., direction) of the counting could be reversed.

Heat comparator 22 determines whether there is sufficient heat savings to be used and in this case is implemented by a 20-input "OR" gate 24. If there are any heat savings (i.e., the counter is different than zero), the "Savings" line 26 will be high (a logic "1"). This signal is used, along with the "Active" line 25 from activity monitor 18, by clock rate selector 30 to determine the clock rate on line 32 in accordance with the FIG. 3 table.

Variable clock generator 28 selects among 3 possible clock rates for the chip 16. The clock rates are conveniently taken from the system clock generator 14. $f_L$ is the lowest clock rate and is used to clock the CPU when there is no activity. $f_N$ is the clock rate at which the CPU operates normally and when there are no heat savings (the counter is zero). $f_H$ is the high clock rate that is used when the CPU is doing work and there are heat savings (the heat counter is greater than zero). $f_c$ is the clock rate used to clock counter 12 and it may or may not be the same as one of the other three clock rates. The FIG. 3 table defines the various states and operation modes for the variable clock generator 28. The improvement in overall chip throughput depends on the characteristics of the particular application. For example, consider a CISC type processor made of one CPU VLSI chip and a second external chip working as a math coprocessor (e.g., the Intel 80386 and 80387). In a particular program, the main CPU may have to wait for the math coprocessor to finish a relatively long floating point operation before it can continue. During this period, heat generation can be saved by lowering the main CPU clock rate to minimum allowed by the technology. After the floating-point operation is finished, the subsequent main CPU instructions can be executed with a higher clock rate, speeding up the overall performance. The ratio of the idling period to the active period, and the interleaving instruction ratio (i.e., the mix between idling and active periods, without having a long active period followed by a long idling one), will determine the overall gain in speed performance.

The varying clock speed principle can be used in accordance with this invention in an even wider application. Consider a parallel computer architecture made of many "one chip" CPUs. The interconnection network can be (and is in most cases) the performance bottleneck due to long latency times present for global information interchange. The cause for this time latency might be due to the interconnection network performance, or because of concurrently accessing common global data needed by a certain parallel program. Using the principle of varying the clock rates of each CPU, it is possible to make up for the lost waiting time, resulting in an overall performance improvement as if there was no time latency in accessing the global network.

Transaction processing is another good example. This application is characterized by short burst type operations, with idling periods in between. Increasing the clock rate while processing the transactions is possible if the circuits can rest (i.e., produce little heat) while they are idling.

As should be apparent to anyone of ordinary skill in the field, this invention may be applied for use in any electronic circuit that is performance bounded by the heat-dissipation ability of its package, as long as the nature of the application using this circuit displays idling periods. Furthermore, the monitoring and control mechanism is so simple to build that it can be implemented on the same chip that it controls. That is, everything in FIG. 2 other than the system clock generator (and possibly that as well) could be moved onto the chip 16.

It should also be readily apparent that this invention may be applied to achieve a similar result in chip technologies in which the heat generation does not vary with clocking speed (e.g., in bipolar technologies such as ECL). In all chip technologies there is a circuit driving parameter which can be varied in order to vary the heat being generated (e.g., drive current in ECL technology). In accordance with this invention, the circuit driving parameter which does cause a variation in the generated heat (e.g., the drive current for the circuit) is the circuit driving parameter which is varied.

While the preferred embodiment utilizes three values for the circuit driving parameter which is varied, it should be apparent also that two (or four or more) values could be used instead. While the preferred embodiment also involves only drive parameter values which result in the circuit remaining in operation, it should be apparent as well that a drive parameter value could be used which results in loss of operation of the circuit. This creates no problem when the circuit is idle, and even when the circuit is not idle the higher speed in the high speed mode might more than offset some enforced time in an idling inoperative mode while heat is being dissipated.

While the invention has been described in its preferred embodiment, it is to be understood that changes in form and details of the above description may be made without departing from the true scope and spirit of the invention.

We claim:

1. A variable clocking mechanism for an electronic circuit chip in which heat generated by circuits in the chip and speed performance of those circuits both increase with a clock frequency used to clock those circuits, comprising:
    means for generating a high clock frequency for clocking circuits in said chip at a higher than normal rate, said circuits generating heat when clocked at said high clock frequency at a rate which cannot be sustained indefinitely without damage to said chip;
    means for generating a low clock frequency for clocking circuits in said chip at a lower than normal rate, said circuits generating less heat when clocked at said low clock frequency than if said circuits were clocked at a normal rate;
    activity monitoring means for sensing an idle status for circuits in said chip;
    means responsive to said activity monitoring means for clocking circuits in said chip at said low clock frequency when said circuits are idle;
    a heat savings accumulator responsive to said clock frequency used to clock said circuits in said chip for estimating an amount of heat generation which is avoided as a result of clocking circuits in said chip at said low clock frequency minus an amount of heat generation which is added as a result of clocking circuits in said chip at said high clock frequency, said heat accumulator having a maximum heat savings which can be accumulated; and
    means responsive to said heat savings accumulator and said activity monitor for clocking at least some of the circuits in said chip which are not idle at said high clock frequency if heat savings have been accumulated.

2. A variable clocking mechanism as defined in claim 1 and further comprising:
    means for generating a normal clock frequency between said high clock frequency and said low clock frequency for normally clocking circuits in said chip, said circuits generating heat when clocked at said normal clock frequency at a rate which can be sustained indefinitely without damage to circuits in said chip.

3. A variable circuit driving mechanism for an electronic circuit chip in which heat generated by circuits in the chip and speed performance of those circuits both increase with a circuit driving variable, comprising:
    means for generating a high value for said circuit driving variable for driving circuits in said chip at a higher than normal speed performance level, said circuits generating heat when driven at said higher than normal speed performance level which cannot be sustained indefinitely without damage to said chip;
    means for generating a low value for said circuit driving variable for driving circuits in said chip at a lower than normal speed performance level, said circuits generating less heat when driven at said lower than normal speed performance level than if said circuits were driven at a normal value for said circuit driving variable;
    activity monitoring means for sensing an idle status for circuits in said chip;
    means responsive to said activity monitoring means for driving circuits in said chip at said low value for said circuit driving variable when said circuits are idle;
    a heat savings accumulator responsive to the value of said circuit driving variable used to drive said circuits in said chip for estimating the amount of heat generation which is avoided as a result of driving said circuits in said chip at said low value for said circuit driving variable minus the amount of heat generation which is added as a result of driving circuits in said chip at said high value for said circuit driving variable, said heat accumulator having a maximum heat savings which can be accumulated; and
    means responsive to said heat savings accumulator and said activity monitor for driving at least some of said circuits in said chip which are not idle at said high value for said circuit driving variable if heat savings have been accumulated.

4. A variable circuit driving mechanism as defined in claim 3 wherein said circuit driving variable is a clock frequency used to drive said circuit.

5. A variable circuit driving mechanism as defined in claim 3 wherein said circuit driving variable is the drive current used to drive said circuit.

6. A variable circuit driving mechanism as defined in claim 3 and further comprising:
    means for generating a normal value for said circuit driving variable between said high value and said low value for normally driving circuits in said chip, said circuits generating heat when driven at said normal value for said circuit driving variable at a rate which can be sustained indefinitely without damage to circuits in said chip.

7. A variable circuit driving mechanism as defined in claim 3 wherein said variable circuit driving mechanism is implemented on the same chip as the circuits being variably driven thereby.

* * * * *